(12) United States Patent
Patel

(10) Patent No.: US 9,060,024 B2
(45) Date of Patent: Jun. 16, 2015

(54) SECURITY EVENT DATA NORMALIZATION

(75) Inventor: Rajesh Patel, Los Altos, CA (US)

(73) Assignee: Log Storm Security, Inc., Piscataway, NJ (US)

( * ) Notice: Subject to any disclaimer, the term of this patent is extended or adjusted under 35 U.S.C. 154(b) by 641 days.

(21) Appl. No.: 12/418,815

(22) Filed: Apr. 6, 2009

(65) Prior Publication Data

US 2009/0276843 A1 Nov. 5, 2009

Related U.S. Application Data

(63) Continuation of application No. 11/149,086, filed on Jun. 8, 2005, now abandoned.

(60) Provisional application No. 60/578,281, filed on Jun. 8, 2004.

(51) Int. Cl.
*H04L 29/06* (2006.01)
*H04L 12/26* (2006.01)
*H04L 12/24* (2006.01)
*H04L 29/08* (2006.01)

(52) U.S. Cl.
CPC ............ *H04L 63/20* (2013.01); *H04L 12/2602* (2013.01); *H04L 41/0226* (2013.01); *H04L 41/069* (2013.01); *H04L 43/00* (2013.01); *H04L 67/2823* (2013.01)

(58) Field of Classification Search
CPC . H04L 12/2602; H04L 63/20; H04L 63/0227; H04L 63/1408; H04L 41/0226; H04L 67/2823; H04L 43/00; H04L 41/069

USPC .................. 726/13, 1, 4, 5, 22, 23, 24, 25
See application file for complete search history.

(56) References Cited

U.S. PATENT DOCUMENTS

| | | | | |
|---|---|---|---|---|
| 5,953,263 | A * | 9/1999 | Farmwald et al. | 365/194 |
| 6,377,987 | B1 * | 4/2002 | Kracht | 709/220 |
| 6,516,345 | B1 * | 2/2003 | Kracht | 709/220 |
| 6,597,957 | B1 * | 7/2003 | Beakley | 700/7 |
| 6,609,205 | B1 * | 8/2003 | Bernhard et al. | 726/22 |
| 6,650,641 | B1 * | 11/2003 | Albert et al. | 370/392 |
| 6,724,750 | B1 * | 4/2004 | Sun | 370/352 |
| 6,745,011 | B1 * | 6/2004 | Hendrickson et al. | 455/67.11 |
| 6,856,614 | B1 * | 2/2005 | Sun | 370/352 |
| 6,883,057 | B2 * | 4/2005 | Moy | 710/314 |
| 6,895,589 | B2 * | 5/2005 | Bermudez et al. | 719/321 |
| 7,100,132 | B2 * | 8/2006 | Hildebrant et al. | 716/103 |
| 7,124,375 | B1 * | 10/2006 | Steele et al. | 715/865 |
| 7,130,297 | B1 * | 10/2006 | Sun | 370/352 |
| 7,219,239 | B1 * | 5/2007 | Njemanze et al. | 726/3 |
| 7,272,646 | B2 * | 9/2007 | Cooper et al. | 709/223 |
| 7,376,969 | B1 * | 5/2008 | Njemanze et al. | 726/22 |
| 7,451,071 | B2 * | 11/2008 | Ferguson et al. | 703/22 |

(Continued)

OTHER PUBLICATIONS

Office Action issued in U.S. Appl. No. 11/149,083 on Oct. 6, 2008.

*Primary Examiner* — David García Cervetti
(74) *Attorney, Agent, or Firm* — DLA Piper LLP (US)

(57) ABSTRACT

Normalizing security event data from multiple different network agents. The data from the multiple different agents is categorized and tagged with a descriptor that includes information about the nature of the event. Multiple different events from multiple different devices can therefore be evaluated using a common format which is common for the multiple different devices from different vendors.

14 Claims, 8 Drawing Sheets

| ht_sig_cat | ht_device_cat | ht_event_cat | ht_event_id |
|---|---|---|---|
| 0000 | 00000 | 0000000000 | 0000000000000 |

TVS Event Tag

(56) References Cited

U.S. PATENT DOCUMENTS

| | | | |
|---|---|---|---|
| 7,540,031 B2* | 5/2009 | Kouznetsov et al. | 726/25 |
| 7,607,169 B1* | 10/2009 | Njemanze et al. | 726/22 |
| 7,650,638 B1* | 1/2010 | Njemanze et al. | 726/23 |
| 7,668,953 B1* | 2/2010 | Sinclair et al. | 709/224 |
| 7,827,611 B2* | 11/2010 | Kouznetsov et al. | 726/24 |
| 7,861,303 B2* | 12/2010 | Kouznetsov et al. | 726/24 |
| 8,056,130 B1* | 11/2011 | Njemanze et al. | 726/22 |
| 8,176,527 B1* | 5/2012 | Njemanze et al. | 726/2 |
| 8,230,507 B1* | 7/2012 | Njemanze et al. | 726/23 |
| 8,613,083 B1* | 12/2013 | Njemanze et al. | 726/22 |
| 2001/0052033 A1* | 12/2001 | Bermudez et al. | 709/321 |
| 2002/0087882 A1* | 7/2002 | Schneier et al. | 713/201 |
| 2003/0061506 A1* | 3/2003 | Cooper et al. | 713/201 |
| 2003/0084349 A1* | 5/2003 | Friedrichs et al. | 713/201 |
| 2003/0158993 A1* | 8/2003 | Moy | 710/306 |
| 2003/0188189 A1* | 10/2003 | Desai et al. | 713/201 |
| 2004/0044422 A1* | 3/2004 | Fux et al. | 700/17 |
| 2004/0193943 A1* | 9/2004 | Angelino et al. | 714/4 |
| 2004/0221190 A1* | 11/2004 | Roletto et al. | 714/4 |
| 2005/0015624 A1* | 1/2005 | Ginter et al. | 713/201 |
| 2005/0125807 A1* | 6/2005 | Brady et al. | 719/318 |
| 2005/0180423 A1* | 8/2005 | Liao et al. | 370/392 |
| 2006/0282878 A1* | 12/2006 | Stanley et al. | 726/1 |
| 2007/0050777 A1* | 3/2007 | Hutchinson et al. | 718/104 |
| 2007/0180490 A1* | 8/2007 | Renzi et al. | 726/1 |
| 2007/0294369 A1* | 12/2007 | Ginter et al. | 709/217 |
| 2008/0209033 A1* | 8/2008 | Ginter et al. | 709/224 |

* cited by examiner

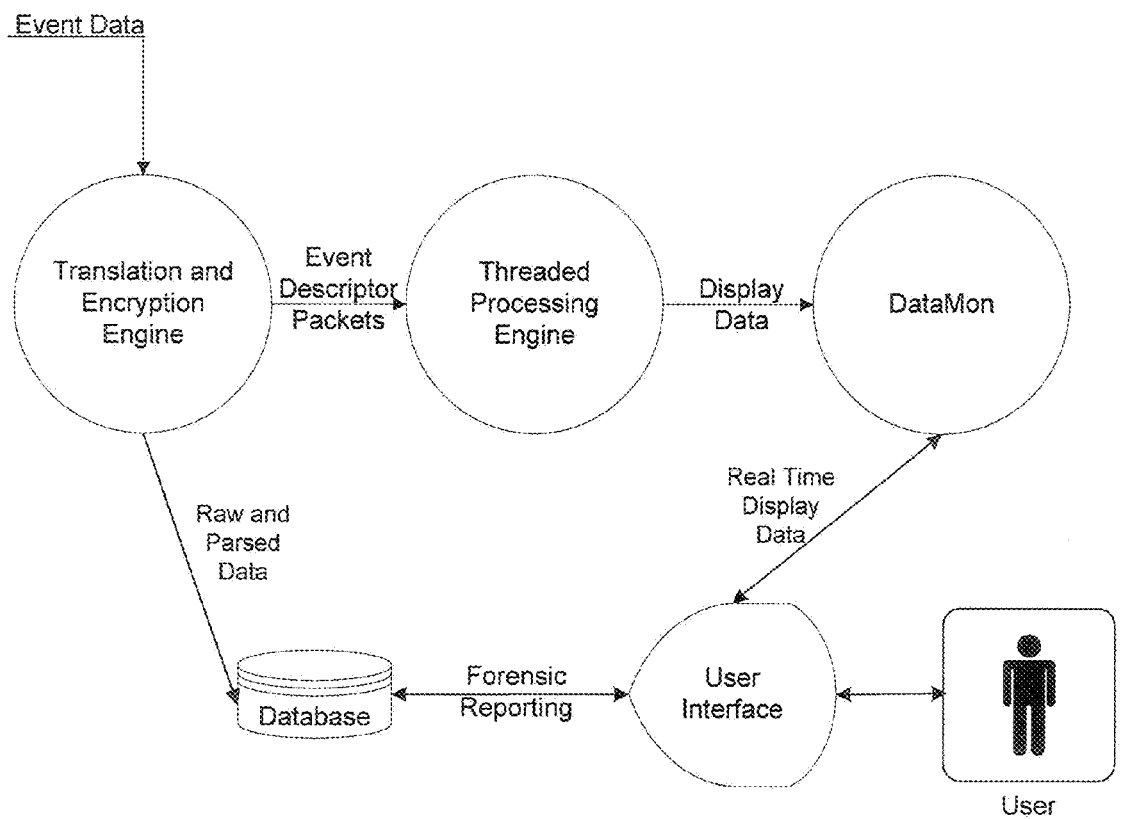
Figure 1. TVS Functional Areas

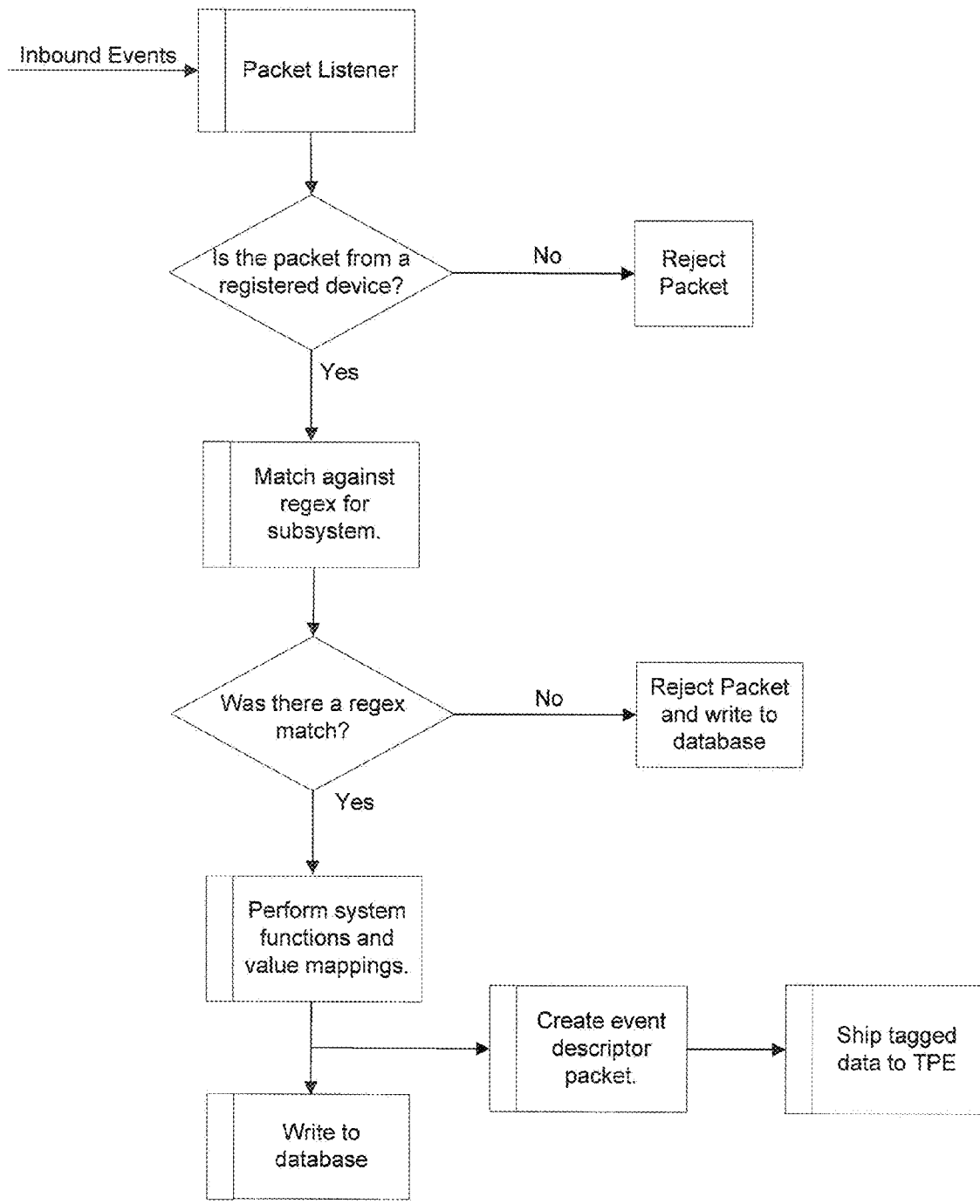
Figure 2. TEE Logical Flow

| ht_sig_cat | ht_device_cat | ht_event_cat | ht_event_id |
|---|---|---|---|
| 0000 | 00000 | 0000000000 | 0000000000000 |

Figure 3. TVS Event Tag

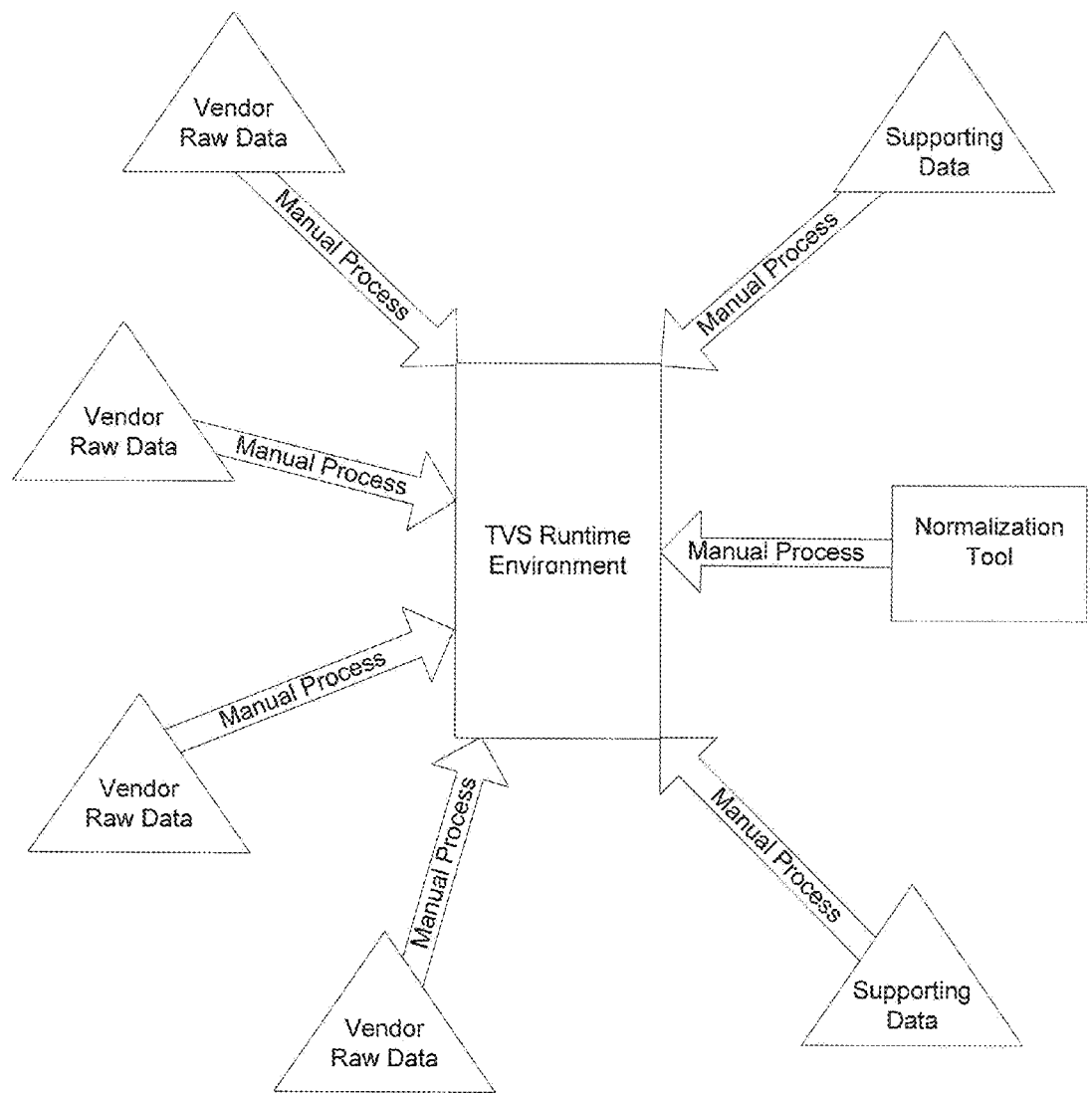
Figure 4. Initial state of TVS data requirements support.

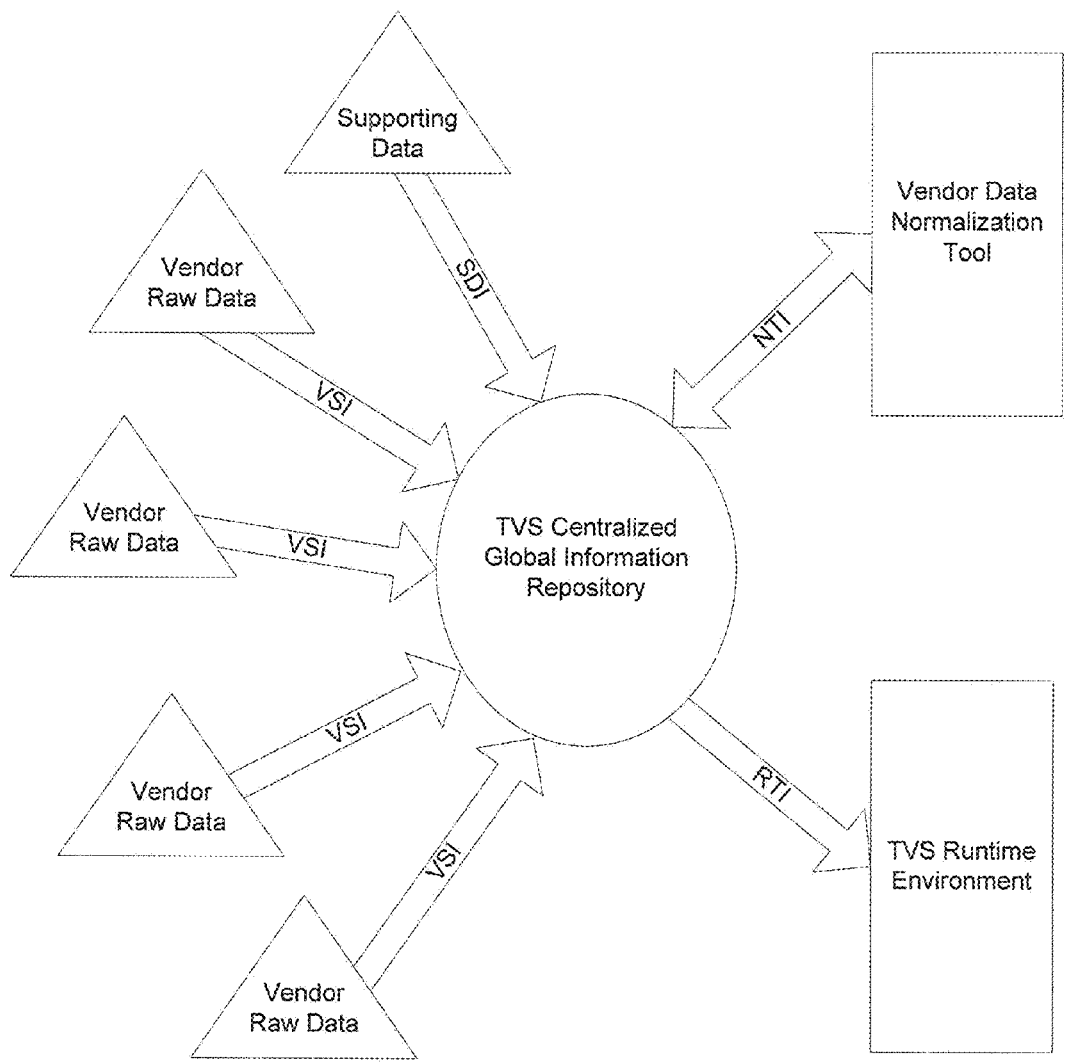
Figure 5. Example of a Centralized Global Information Repository

/opt/towerview/demo/vm/

| | |
|---|---|
| default-system.vm | #value map registration point |
| 'subsystem-name1.vm" | #registered subsystem signature id value map |
| 'subsystem-name2.vm" | #registered subsystem signature id value map |
| ~etc. | |

/usr/local/mysql/var/tv_data

| | |
|---|---|
| vendors | #information about vendor references |
| agent_refs | #information about vendor references |
| ~etc. | |

/opt/towerview/demo/

| | |
|---|---|
| config.xml | #information about vendor devices |
| ~etc. | |

/opt/towerview/demo/ruletemplates

| | |
|---|---|
| valuemappings | #ht_id to message value mappings for use in the DM |
| ~etc. | |

Figure 6. TVS Runtime Requirements.

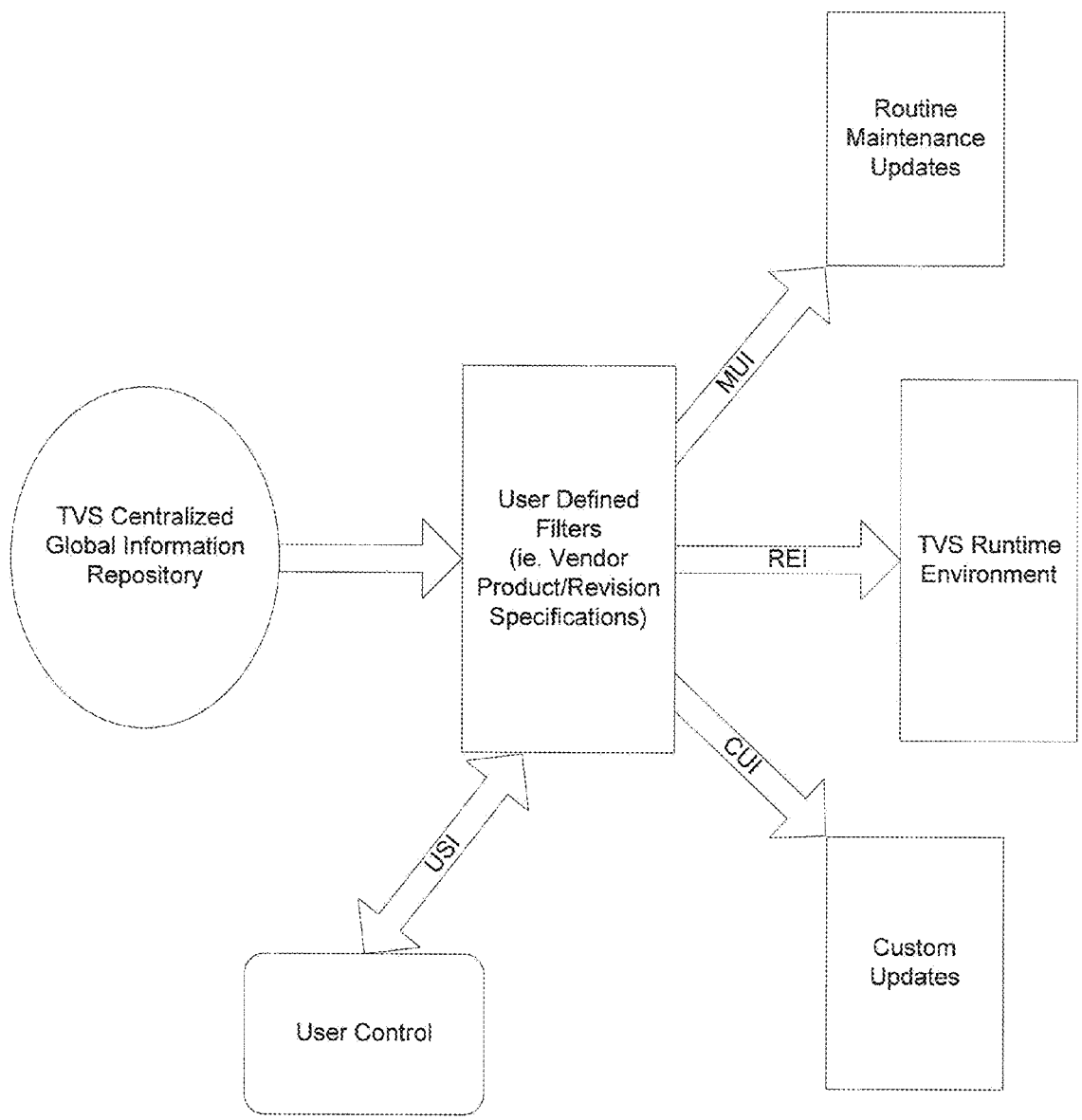
Figure 7. TVS Runtime Requirements Delivery Automation.

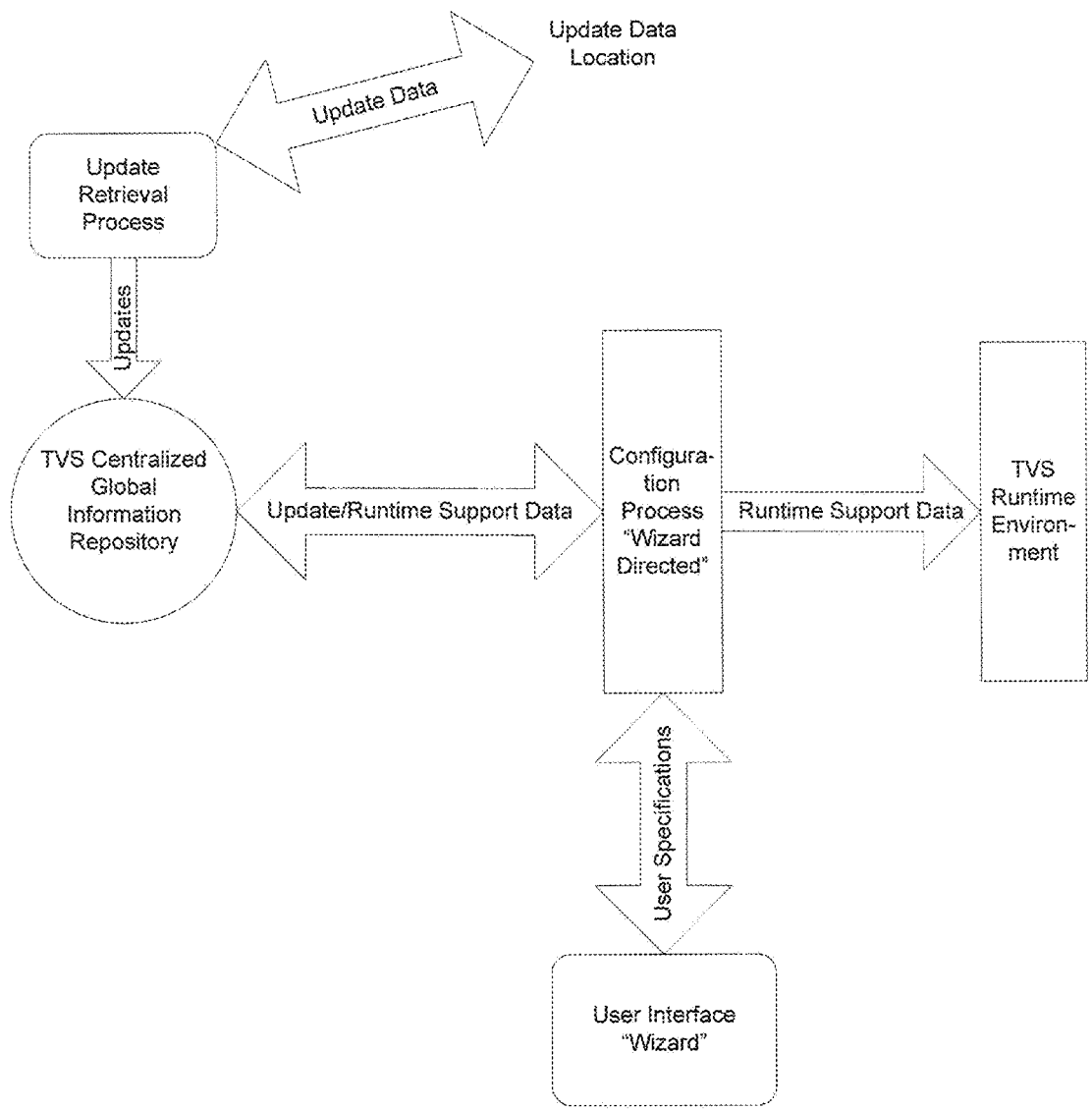
Figure 8. TVS Update Process.

SECURITY EVENT DATA NORMALIZATION

This application is a continuation of U.S. application Ser. No. 11/149,083 filed Jun. 8, 2005. U.S. application Ser. No. 11/149,083 is the non-provisional of U.S. Provisional Ser. No. 60/578,281 filed Jun. 8, 2004. The entirety of all of the above-listed Applications are incorporated herein by reference.

BACKGROUND

In the world of security event management, every one is speaking a different language. This stems from the fact that there is no industry wide standard language used to describe security events. Therefore, each vendor provides notification of detected events in their own proprietary format.

SUMMARY

In order to accommodate the disparity in vendor event notification formats, HighTower Software has developed a method of normalizing events from each vendor's proprietary format into a common format. By development of a categorization scheme and associated tagging process, each event that enters the normalizing application is evaluated and tagged with a descriptor that carries specific information about the nature of the event. This technique allows events to be evaluated in a common context, while retaining the vendor specific context.

BRIEF DESCRIPTION OF THE DRAWINGS

These and other aspects will now be described in detail with reference the accompanying drawings, wherein:

FIG. 1 shows a block diagram of the overall system operation;

FIG. 2 illustrates the logical information flow within the translation and encryption engine;

FIG. 3 illustrates an exemplary event tag;

FIG. 4 illustrates the normalization runtime environment and the data that it receives;

FIG. 5 illustrates the information registry receiving the data from various items;

FIG. 6 illustrates the runtime requirements of the system;

FIG. 7 illustrates the automation of delivery of these runtime requirements; and FIG. 8 illustrates the update procedure that allows for application maintenance.

DETAILED DESCRIPTION

FIG. 1 shows a block diagram with three discreet functional parts, including the Translation and Encryption Engine (TEE) 100, the Threaded Processing Engine (TPE) 110 and the Data Monitor (Datamon or DM) 120.

The TEE is responsible for the validation, initial processing, formatting, database storage, and the forwarding to the TPE of data received from devices that are monitored by TVS. The TPE is responsible for performing analysis, according to user specified configuration directives, in the form of rules assignment, of the event data it receives from the TEE. Once analysis has been performed, the result's of that analysis are sent to the Datamon as display updates. The Datamon is responsible for providing the TVS user with 3D graphical display of the analysis performed by the TPE on events that have been received and processed by the TEE. Additionally a web based portal may be available to provide the TVS user with an environment in which to generate forensic analysis reports from the data contained in the TVS runtime database.

The event data normalization process is implemented as part of the TEE. Devices which are to be monitored by TVS are registered with the TEE. As part of this registration process, they are assigned a subsystem type. This subsystem type defines the set of rules by which these events are to be processed. As events from registered devices are received by the TEE, they are broken down into their elemental components. These elemental components include such items as device IP Address, Packet Source IP Address, Packet Source Port, Packet Destination IP Address, Packet Destination Port, Signature Identifier and a number of other items of data that are specific to a particular subsystem type. From this set of elemental components the Signature Identifier is used to match against a predetermined list of relationships or value mappings that serve to assign a tag to the event. This tag is carried with the packet of elemental components or event descriptor packet that is used to process the event within the TVS application.

TVS provides support for many device categories and many device variants within each category. Within a specific device category message format and content may differ based on each vendor's specific message format, message content and message or signature identifier. Different categories of devices may provide messages containing information about an event that is also presented by another category of device about the same event. The format and content of these different messages about the same event will likely differ. TVS provides a methodology first for normalization of data provided by disparate devices within each category and secondly for normalization of data about the same event by devices in different categories.

Tee functionality

The Translation and Encryption Engine (TEE) 100 includes a software code that receives, validates, transforms, normalizes, buffers and sends data between one or more components in the TowerView Security system. The TEE's primary purpose is to transform the data received from a network agent, such as a firewall, nids, or hids, and convert it into a common format which can be understood by other components in the system. Then this processed data is forwarded to one of the many connected targets, such as the processing engine (PE) or the data monitor (DM). The TEE's secondary purpose is to store the raw and translated data to a database repository for forensic analysis. A high level logical flow of the TEE is depicted in FIG. 2.

Tags

In order to provide state-full normalization of data to the processing engine we assign a tag to each event that is processed. This tag contains meta information about the event that will be used by the rule set in the TPE.

Tag Structure

The Hightower Security Event TAG is a 32 binary bit segmented data entity. Each segment provides specific information about the event it tags. The currently defined structure of the ht_event_tag is shown in FIG. 3.
ht_sig_cat:

To support normalization of event data between categories of devices we require broad classification of events. This reflects the severity of the event in the context of network security. These broad classifications have currently been defined as Uncategorized, Unknown, Normal, Reconnaissance, Malicious, Compromised and Health/Status. These classifications are reflected in a four-position binary tag field labeled ht_sig_cat. The current mapping for the values of the ht_sig_cat tag field are shown below in Table 1.

TABLE 1 ht_sig_cat key

| ht_sig_cat | Category |
|---|---|
| 1 | Uncategorized |
| 2 | Unknown |
| 3 | Normal |
| 4 | Reconnaissance |
| 5 | Malicious |
| 6 | Compromised |
| 7 | Health/Status |

The ht_sig_cat tag describes at a high level the nature of the event being evaluated.
ht_device_cat:

To support normalization of event data provided by like devices, perhaps from different vendors, with different event data formats we are required to defined device categories. These classifications are reflected in a five-position binary tag field labeled ht_device_cat. The current mappings for the values of the ht_device_cat tag field are shown in Table 2.

TABLE 2 ht_device_cat key

| ht_device_cat | Category |
|---|---|
| 1 | Firewall |
| 2 | Intrusion Detection System |
| 3 | Router |
| 4 | Vulnerability Assessment |
| 5 | VPN |
| 6 | Tbd |
| 7 | Tbd |

The ht_device_cat tag describes the type of device has sent us the data about the event being evaluated.
ht_event_cat:

Table 2 shows five device categories. The events that may be identified by a device in a particular category, for example an Intrusion Detection System, we will see that these events also fall into a specific number of categories. These event categories are largely common amongst different IDS implementations. To provide normalization of events from different implementations of like devices we are required to provide classification of events by event category. These classifications are reflected in a ten-position binary tag field labeled ht_event_cat. For example for an Intrusion Detection System mappings for the values of the ht_event_cat field are shown below in Table 3.

TABLE 3 ht_event_cat key for IDS

| ht_event_cat | Category |
|---|---|
| 101 | Attack Response |
| 102 | Backdoor |
| 103 | Bad Traffic |

TABLE 3-continued ht_event_cat key for IDS

| ht_event_cat | Category |
|---|---|
| 104 | Chat |
| 105 | DDOS |
| 107 | DNS |
| 108 | DOS |
| 109 | Exploit |
| 110 | Finger |
| 111 | FTP |
| 112 | ICMP-Info |
| 113 | ICMP |
| 114 | IMAP |
| 115 | Info |
| 116 | Local |
| 117 | Misc |
| 118 | Multimedia |
| 119 | Mysql |
| 120 | Netbios |
| 121 | Nntp |
| 122 | Oracle |
| 123 | Other-IDS |
| 124 | P2p |
| 125 | Policy |
| 126 | Pop2 |
| 127 | Pop3 |
| 128 | Porn |
| 129 | Rpc |
| 130 | Rservices |
| 131 | Scan |
| 132 | Shellcode |
| 133 | Smtp |
| 134 | Snmp |
| 135 | Sql |
| 136 | Telnet |
| 137 | Tftp |
| 138 | Virus |
| 139 | Web-attacks |
| 140 | Web-cgi |
| 141 | Web-client |
| 142 | Web-coldfusion |
| 143 | Web-frontpage |
| 144 | Web-iis |
| 145 | Web-misc |
| 146 | Web-php |
| 147 | X11 |
| 148 | Packet Discarded | ht_event_id:

Within each ht_event_cat we have allowed for up to 8192 unique event ids. These classifications are reflected in a thirteen-position binary tag field labeled ht_event_id.
Application of the ht_event_tag For example consider an event reported by the following snort NIDS rule:
alert tcp $EXTERNAL_NET any->$DNS_SERVERS 53~"thisissometempspaceforthe-sockinaddrinyeahyeahiknowthisisla mebutanywaywhocare-shorizongotitworkingsoalliscool"

If this rule triggers it indicates that a DNS compromise has occurred. This vulnerability is described in CVE-1999-0833, BUGTRAQ ID 788 and CERT CA-1999-14. This event will be assigned a ht_event_tag of 610D400C (hex) or 1628258316 (decimal). From the binary perspective that is ht_sig_cat 6 (compromised), ht_device_cat 2 (IDS), ht_event_cat 107 (DNS) and ht_event_id 12 (ADM DNS overflow).

Consider the following Dragon NIDS rule:
SIGNATURE=T D A B 10 0 53 DNS:ADM-OVERFLOW thisissometempspaceforthesockinaddr This rule is written to detect the same event as the snort rule above. Detection of these events by disparate IDS systems will produce an identical ht_event_tag. This event will be assigned a ht_event_tag of 610D400C (hex) or 1628258316 (decimal). From the binary perspective that is ht_sig_cat 6 (compromised), ht_device_cat 2 (IDS), ht_event_cat 107 (DNS) and ht_event_id 12 (ADM DNS overflow).

Note: If this event were to be detected by the Cisco PIX Firewall IDS feature, the field ht_device_cat in the ht_event_tag would reflect a device type of 1 and the resulting ht_event_ tag would be 608D400C (hex) or 1619869708 (decimal). From the binary perspective that is ht_sig_cat 6 (compromised), ht_device_cat 1 (FW), ht_event_cat 107 (DNS) and ht_event_id 12 (ADM DNS overflow).

In the present system, with snort and Dragon, the ht_event_ tag is identical. Events detected from different points in your network and by devices from different vendors can be correlated and identified as identical events. This enables evaluation of the effectiveness of a network's defense in depth by showing the progress or lack of progress of hostile events across the layers of your network. In the context of TVS, device chains can be identified, which are used to notify operators of the detection of identical events by devices at multiple points in the network.

Vulnerability Assessment Correlation

Consider the case of a network that employs use of a Vulnerability Assessment (VA) system. That is a system that by varying methods and vary degrees of intrusiveness examines the nodes on a given network segment for their susceptibility to a set of vulnerabilities known by the vendor of the VA system. VA systems generally produce a set of results of the analysis of networks they scan. Network and System Administrators have traditionally used this data to guide them as to which systems require patching for the various vulnerabilities that have been discovered.

Consider the Foundstone VA tool which runs a series of scripts that are used to detect vulnerabilities in nodes on a given network segment. One of the scripts that the Foundstone VA tool runs is unix-chargen-dos-v2.fasl3. This script is used to detect unix systems that are vulnerable to chargen dos exploits. The chargen service generates random characters and this service can be used in conjunction with other services to cause a denial of service attack via flooding.

The following snort NIDS rule is used to detect instances of this exploit on the networks it monitors.

alert udp any 19< >any 7 (msg:"DOS UDP echo+chargen bomb"; reference:cve, CAN-1999-0635; reference:cve, CVE-1999-0103; classtype:attempted-dos; sid:271; rev:3;)

In order to eliminate false alarms and unnecessary response to events to which we are not vulnerable and to enhance our sense of urgency and highlight those events to which we are vulnerable we can use capabilities enabled by the TVS normalization process to determine if there is a correlation between NIDS detected hostile events and the network vulnerabilities reported by our VA tool.

In order to provide for VA correlation, TVS builds a table which reflects the state of node vulnerabilities on the monitored network segment, based on data provided by the VA tool deployed in the network. To build that table TVS must acquire and process the VA data from the VA tool. The particular method of data acquisition from the VA tool is vendor dependent.

Acquisition of VA Data

In order to support VA correlation we acquire the following elements of data from the VA tool results set. Our query, which is performed by the script getvadata.pl, populates three files. These files are va_vulns.dat, va_os_scandate.dat, and va_ports_open.dat. The file va_vulns.dat contains three data items; they are ipaddr_converted, ht_event_tag, and va_sid. The file va_os_scandate.dat contains three items of data; they are ipaddr_converted, OS, and va_scandate. The file va_ports_ open contains three items of data; they are ipaddr_converted, protocol and port.

File Use and Population va_vulns.dat:
This file, which contains a listing the vulnerabilities that have been detected by a Vulnerability Scan, will document the IP address of the vulnerable device and the relationship between ht_tag and VA tools sid for the event. The script getvadata.pl will query the VA tool results set and select the IPAddress of the vulnerable network node and the sid. The sid is used as an index to assign an ht_event_tag from the VA devices value-map file. The VA devices value-map file documents the relationship between the VA devices sid and the associated ht_event_tag.

The data item ipaddr_converted will be constructed from the item in the VA tool results set that represents the IP address of the vulnerable device. The data item ht_event_tag is determined by using the VA tools event sid to index the value-map file, retrieving the appropriate value. The data item va_sid is retrieved directly from the VA tool results set.
va_os_scandate:
This file, contains scan dates and Operating Systems (OSs), and documents the IP address of the vulnerable device, its Operating System and the date that the last VA scan was performed.

The data item ipaddr_converted is constructed from the item in the VA tool results set that represents the IP address of the vulnerable device. For each IP address we will query the VA tool results set for the OSName. For each IP address we will query the VA tool results set for the date/time of the VA scan. The file va_os_scandate will be populated with ipaddr_converted, OS and va_scandate.
va_ports_open:
This file, contains a list of active services, and documents the IP address of the device as well as the protocol and port of any active services.

The data item ipaddr_converted is constructed from the item in the VA tool results set that represents the IP address of the vulnerable device. The data item protocol is constructed from the item in the VA tool results set that represents the protocol used to access the vulnerability on the vulnerable device. The data item port is constructed from the item in the VA tool results set that represents the port used to access the vulnerability on the vulnerable device. The file va_ports_ open will be populated with ipaddr_converted, protocol and port.
VA Correlation Once the VA files have been populated and the runtime table that reflects the state of the VA assessment has been built within TVS, analytics are used monitor events which may exploit particular vulnerabilities. If an event is evaluated and found to be an exploit destined for a node that has a documented vulnerability for that exploit an alarm indicating this can be issued to the TVS operator.

Consider the previous example of the dos+chargen bomb. The snort rule that detects this event, alert udp any 19< >any 7 (msg:"DOS UDP echo+chargen bomb"; reference:cve, CAN-1999-0635; reference:cve,CVE-1999-0103; classtype: attempted-dos; sid:271; rev:3;), is assigned the ht_event_tag 5:2:108:3 (ht_sig_cat 5 or malicious, ht_dev_cat 2 or IDS, ht_event_cat 108 or DOS, ht_event_id (in ht_event_cat 108) 3 or DOS UDP echo+chargen bomb) and it is represented by the decimal number 1359839235.

Next consider the vulnerability detected by the Foundstone VA tool script unix-chargen-dos-v2.fasl3. This vulnerability is assigned the ht_event_tag 5:4:108:3 and it is represented by the decimal number 1376616451. If the Foundstone VA tool determined that this vulnerability existed on a node that was assigned the IP address 10.1.15.106 the file va_vulns.dat would contain the following entry:

ipaddr_converted<|>ht_event_tag<|>va_sid
167841642<|>1376616451<|>673

At runtime the table that reflects the state of vulnerabilities in the monitored network will reflect this information. When an event is detected with a destination IP address that matches an entry in this table entry the ht_event_tags are compared, excluding the ht_dev_cat segment, which is different because and IDS detected the event and a VA tool detected the existence of the vulnerability.

If a system is not vulnerable to an exploit, but is still listening on a port that is used by an exploit, we can alert the TVS operator to this by referencing the data contained in the table va_ports_open.dat. If the node was a Sun Server running the sunrpc service the file va_ports_open.dat might contain the following entry:

ipaddr_converted<|>protocol<|>port
167841642<|>tcp<|>111

The currency of VA scans is evaluated by monitoring the file va_os_scandate.dat. The file va_os_scandate.dat might contain the following entry:

ipaddr_converted<|>OS<|>scandate
167841642<|>Linux2.4.7-13<|>1084386780

As a result of the above examination of the use of the TVS Event Data Normalization Architecture and process you should have a good understanding of the functionality and application of this technology. We also need to gain an understanding of the nature and magnitude of the data that we are dealing with in our process of Event Data Normalization. Towards that end we will examine the data requirements of TVS.

Data Requirements Overview:

In order to support the goal of becoming a market ready production class SEM tool it is evident that managing the volume of information required to develop, build and support the product will require a detailed, well thought out information management architecture.

Initial State:

In order to begin this effort, it is necessary to understand the data requirements that TVS had and the current methods of supporting those requirements. TVS has a number of data requirements, these include value mappings that provide translations from vendor signature identifier to HighTower signature identifier; value mappings that provide translations from HighTower signature identifier to event textual description; value mappings that provide translations from port number to service name and there are many requirements for vendor information support in order to provide the forensic capabilities of the portal. As can be seen in FIG. 4 the initial state of TVS required that a number of manual processes be performed to populate the files and databases that are used in the TVS runtime environment.

These manual processes are cumbersome at best and non-repeatable at worst. The information used to support or feed these processes resided only on the desktop of staff workstations. Revision control ranged from difficult to non-existent and information updates are not easily implemented.

Solution:

In order to support the data requirements of TVS, a Centralized Global Information Repository has been defined and developed as has the definition and development of a number of interfaces to that repository. A high level example of this repository and its interfaces can be seen in FIG. 5.

In order to develop this repository a number of steps are required. At a high level these included:
Define the components within the TVS environment that will require access to the repository.
  Supported component name
  Function provided
Define the nature of the access required.
  Read only, read/write, read/modify/write, write only
  Reason for access
Define change control policy.
  Process
  Revision management
  Enforcement
  Rollbacks Once the components are identified, the details of their access requirements is defined. This looks like:
Define the detailed data requirements of the TVS runtime environment.
  Define the method of interface to the TVS runtime environment
    Read only
  Define runtime database requirements
    Mysql tables
  Define all value mappings files
    Value maps
    Config files
  Define vendor support requirements
    Vendor references and linkages
  Define portal requirements
    Table requirements
    Query requirements
  Define change control policy
    Who, what, when, where and why?
  Define change control process
    How?
  Define current data population processes
    Identify
    Automate
    Document
  Identify output reasons
    Normal runtime builds
    Runtime updates
    Custom builds
      Customer has a custom security device (ie. Snort with custom rules)
    Additional discovery if necessary
Define the detailed data requirements of the Vendor Data Normalization Tool.
  Define the method of interface to the Vendor Data Normalization Tool
    a Read/modify/write
  Define VDNT runtime database requirements
    Tables (view) required
  Define change control policy
    Who, what, when, where and why?
  Define change control process
    How?

Define current data population processes
   Identify
   Automate
   Document
   Additional discovery if necessary
Define the detailed data requirements for supporting data.
   Define the method of interface to the supporting data
     Write only
   Define the content
     Standards
     RFC guidelines
     Port number to name
     Protocol number to name
   Define change control process
     How?
   Define current data population processes
     Identify
     Automate
     Document
     Additional discovery if necessary
Define the requirements for vendor raw data.
   Define the method of interface to the vendor data
     Write only
   Volume of data
     Size-number of records/events
     Number of files or tables
   Format of data
     Table or file structure
   Define change control process
     How?
   Define current data population processes
     Identify
     Automate
     Document
     Additional discovery if necessary A Closer Look at Some Data Requirements:

In order to understand the reasoning behind and the requirements of such a repository, detail about the runtime data requirements of TVS is provided. Some of the environments requirements are depicted in FIG. 6.

This is by no means a complete list of the data requirements of the TVS runtime environment. Up to this point in the history of TVS the data required for runtime had been compiled bit by bit, file by file from disparate sources. Updates had been tedious manual processes. TVS has developed a methodology for providing easily repeatable, automated data update methods. These data updates encompass the entire product and provide maintenance signature updates or even custom signature updates for example for a customer who writes their own snort or Dragon IDS rules. FIG. 7 depicts the process for providing TVS runtime environment data from the central repository. As shown in the diagram the user specifies the requirements of the data population via a "User Control Interface" or "Wizard". This interface allows the user to specify the information required for this instance of the TVS runtime environment data population. In essence simple input data source to output data file specification. In FIG. 7, there are three destinations for data used in TVS runtime. First and most importantly there is the TVS Runtime Environment which is a set of all data required to support the TVS runtime environment. This is used to support full TVS builds. Secondly are routine maintenance updates. These are provide support for vendor event updates. Thirdly are custom updates which provide TVS support for events that are not part of the vendor's event base but are events that the customer has defined which are implemented in the context of a supported vendor's product. For example in the case of snort and Dragon (two IDS' that are currently supported by TVS) functionality is supported that enables the end user to define their own IDS rules. TVS runtime environment data for clients requiring support of custom events is supported in a "one-off" manner.

Each of the components within the TVS environment that will require access to the repository is evaluated to determine how it integrates with the repository. In the case of support for the TVS Runtime Environment a configuration wizard has been developed that is integrated to provide the input controls required to define the TVS Runtime Environment build process.

This functionality requires that some form of the repository ship with the TVS product. The contents of the shipped repository has been scrupulously reviewed and defined so that while providing the customer with the functionality they expect we do not disclose corporate confidential information. For example; we are required to ship the event profiles table, which is the structure that defines the relationships between disparate vendor's definitions of like events, and so that we can support linking to vendors web based documentation in support of the forensic capabilities of the portal, the raw data tables from which the event profiles table is built, but we do not ship the normalization tool that is used to evaluate the raw data tables and produce the event profiles table. The normalization tool, the normalization process and its specific functionality are proprietary items.

The shipped repository also provides a suitable target for periodic maintenance updates for TVS device support and with additional development will serve as a vehicle for TVS application maintenance.

A process for providing maintenance update for device support will include distributing new or updated raw device files, new or updated event profile tables and new or updated value mapping files and any other new or updated files required by the system.

An overview of this process is depicted in FIG. 8.

Although only a few embodiments have been disclosed in detail above, other modifications are possible, and this disclosure is intended to cover all such modifications, and most particularly, any modification which might be predictable to a person having ordinary skill in the art.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method, comprising:
registering, with at least one processor, a network security agent, the registering comprising determining a functional category of the network security agent, the functional category being associated with a numerical identifier;
receiving, with the at least one processor, a packet from the network security agent indicating a network event;
converting, with the at least one processor, the packet to a security event tag that numerically represents a broad classification of the event, the numerical identifier associated with the functional category of the network security agent that detected the event, and a category of the event; and
using the security event tag to represent the event in place of the packet.

2. A method as in claim 1, further comprising determining, with the at least one processor, if the packet is from a registered device.

3. A method as in claim 1, wherein the plurality of functional categories includes a firewall, a network intrusion system, a router, and a virtual private network.

4. A method as in claim 1, wherein the security event tag has common fields for the same event from different network security agents.

5. A method as in claim 1, wherein the security event tag represents at least an IP address, at least one port, and at least one signature identifier.

6. A method as in claim 1, wherein the broad classification is uncategorized, unknown, normal, reconnaissance, malicious, compromised, or health/status.

7. A method as in claim 1, wherein the category of the event is an intrusion detection system category.

8. A system, comprising:
   a port that receives a packet from a network security agent indicating a network event; and
   at least one processor constructed and arranged to:
      register the network security agent, the registering comprising determining a functional category of the network security agent, the functional category being associated with a numerical identifier, and
      convert the packet to a security event tag that numerically represents a broad classification of the event, the numerical identifier associated with the functional category of the network security agent that detected the event, and a category of the event;
   wherein the security event tag represents the event in place of the packet.

9. A system as in claim 8, further comprising the network security agent.

10. A system as in claim 8, wherein the plurality of functional categories includes a firewall, a network intrusion system, a router, and a virtual private network.

11. A system as in claim 8, wherein the security event tag has common fields for the same event from different network security agents.

12. A system as in claim 8, wherein the security event tag represents at least an IP address, at least one port, and at least one signature identifier.

13. A system as in claim 8, wherein the broad classification is uncategorized, unknown, normal, reconnaissance, malicious, compromised, or health/status.

14. A system as in claim 8, wherein the category of the event is an intrusion detection system category.

* * * * *